(12) United States Patent
Deng et al.

(10) Patent No.: US 7,756,084 B2
(45) Date of Patent: Jul. 13, 2010

(54) METHOD, SYSTEM AND DEVICE FOR IMPROVING COMMUNICATION QUALITY IN CDMA SYSTEM

(75) Inventors: Ailin Deng, Shenzhen (CN); Lin Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 557 days.

(21) Appl. No.: 11/743,448

(22) Filed: May 2, 2007

(65) Prior Publication Data

US 2007/0218909 A1 Sep. 20, 2007

Related U.S. Application Data

(63) Continuation of application No. PCT/CN2005/001798, filed on Oct. 31, 2005.

(30) Foreign Application Priority Data

Nov. 4, 2004 (CN) .................. 2004 1 0087171

(51) Int. Cl.
*H04W 4/00* (2009.01)
(52) U.S. Cl. .................. 370/332; 370/328; 370/338; 455/452.2
(58) Field of Classification Search ......... 455/436–444, 455/560, 522, 69, 424, 428, 452.1–453; 370/311, 370/318, 328, 331–332
See application file for complete search history.

(56) References Cited

U.S. PATENT DOCUMENTS

| | | | |
|---|---|---|---|
| 6,141,565 A * | 10/2000 | Feuerstein et al. | ......... 455/560 |
| 6,266,531 B1 | 7/2001 | Zadeh et al. | |
| 6,693,892 B1 | 2/2004 | Rinne et al. | |
| 7,099,682 B2 | 8/2006 | Ben-Eli | |
| 7,260,415 B1 * | 8/2007 | Oh | ............... 455/522 |
| 2002/0090965 A1 * | 7/2002 | Chen et al. | ............... 455/522 |
| 2002/0147953 A1 * | 10/2002 | Catreux et al. | ............... 714/746 |
| 2003/0060201 A1 * | 3/2003 | Soliman | ............... 455/442 |
| 2004/0023660 A1 | 2/2004 | Ben-Eli | |
| 2004/0229619 A1 * | 11/2004 | Adatrao et al. | ............... 455/442 |
| 2006/0205425 A1 | 9/2006 | Ben-Eli | |

FOREIGN PATENT DOCUMENTS

| | | |
|---|---|---|
| CN | 1265811 A | 9/2000 |
| CN | 1446011 | 10/2003 |

* cited by examiner

*Primary Examiner*—Kamran Afshar
(74) *Attorney, Agent, or Firm*—Leydig, Voit & Mayer, Ltd.

(57) ABSTRACT

A method for improving communication quality in a CDMA system includes: storing, groups of quality control parameters for a BS covered by the BSC; adopting, by the BS and an MS covered by the BS, one of the groups of the quality control parameters to interact with each other when the MS sets up a call; monitoring, during the call, communication quality parameters reported by the BS or by the MS; and selecting one of the groups of the quality control parameters according to the communication quality parameters and transmitting the group of the quality control parameters selected to the BS or the MS. A system and a BSC are also disclosed by the embodiments of the present invention. The solution provided by the embodiments of the present invention may improve the communication quality in areas with weak signals.

14 Claims, 1 Drawing Sheet

METHOD, SYSTEM AND DEVICE FOR IMPROVING COMMUNICATION QUALITY IN CDMA SYSTEM

This application is a continuation of International Patent Application No. PCT/CN2005/001798, filed Oct. 31, 2005, which claims priority to Chinese Patent Application No. 200410087171.9, filed Nov. 4, 2004, all of which are hereby incorporated by reference.

FIELD OF THE INVENTION

The present invention relates to Code Division Multiple Address (CDMA) technology, and particularly, to a method, a system and a device for improving communication quality in a CDMA system.

BACKGROUND OF THE INVENTION

System capacity and communication quality are two crucial indexes, which used for assessing the performance of a mobile communication system. Generally, system capacity shows the number of users that can be served by a system simultaneously. Bigger system capacity brings higher profits for operators. Communication quality of the system indicates the quality of services provided by the system for users, and better communication quality means higher client satisfaction and higher profits for operators.

However, system capacity and communication quality may conflict because of the soft capacity, a unique feature of the CDMA system. That is, the system capacity usually expands at the price of communication quality while the communication quality in the system, similarly, improves at the price of system capacity. Therefore simultaneous optimization of both the system capacity and the communication quality in the CDMA system is a subject highlighted at present.

In a conventional CDMA system, a Base Station Controller (BSC) stores power control parameters and handoff parameters of all base stations (BSs) covered by the BSC. The parameters are configured in an initiation process of the CDMA system and usually remain unchanged.

The power control parameters include: a maximum transmit power threshold of a forward channel of a BS, a minimum transmit power threshold of the forward channel of the BS, etc. The maximum transmit power threshold defines the maximum transmit power available to the BS, and the minimum transmit power threshold defines the minimum transmit power available to the BS.

The handoff parameters may include a maximum active set branch threshold, a pilot add threshold (Tadd), a pilot drop threshold (Tdrop), a pilot compare threshold (Tcomp), a dynamic soft handoff slope, a dynamic soft handoff add intercept, a dynamic soft handoff drop intercept and a pilot drop time threshold (Ttdrop), etc.

Through at least one of the power control parameters and the handoff parameters, the BSC controls mobile stations to perform soft handover. For example, on the one hand, the higher the maximum transmit power threshold of the forward channel of the BS is, which is assigned by the CDMA system to the BS, the greater the power available to the BS will be, and the better the communication quality will be; on the other hand, the greater transmit power adopted by the BS may bring interference to other users in the same cell or in adjacent cells, which further leads to capacity drop in the CDMA system.

For another example, a greater maximum active set branch threshold, which is configured by the system, brings larger number of BSs which are allowed to concurrently communicate with a mobile station, therefore mobile stations obtain more soft handover gains and better communication quality. However, the fact that the mobile stations occupy more radio channels leads to system capacity drop.

The applicant finds out that the communication quality between the BSs and the mobile stations can be adjusted by modifying the power control parameters or the handoff parameters.

Conventionally, the power control parameters and the handoff parameters are fixed values stored in databases of BSCs. All mobile stations covered by a same BS share the same parameters which remain unchanged during calls, without regard to the strength of the CDMA signals. However, CDMA signals may be strong in parts of the area and weak in other parts of the area, because of factors such as the geographical environment. For this reason, the communication quality is not satisfied and the call-drop rate are often high in the parts where CDMA signals are weak.

SUMMARY OF THE INVENTION

An embodiment of the present invention provides a method, a system and a device for improving communication quality in a CDMA system, through which the communication quality of mobile stations in an area where CDMA network signals are weak may be improved.

A method for improving communication quality in a Code Division Multiple Access (CDMA) system may include the following processes.

A BSC stores more than one group of quality control parameters for a BS covered by the BSC; monitors communication quality parameters reported by at least one of the BS and an MS covered by the BS during a call; selects one group of the more than one group of the quality control parameters according to the communication quality parameters; and transmits the selected group of the quality control parameters to at least one of the BS and the MS.

A system for improving communication quality in a Code Division Multiple Access (CDMA) system, includes:

a Base Station (BS);

a Mobile Station (MS); and a Base Station Controller (BSC), configured to store more than one group of quality control parameters for the BS; monitor communication quality parameters reported by at least one of the BS and the MS covered by the BS during a call; and select one group of the more than one group of the signal strength level of the area where the MS is located quality control parameters according to the communication quality parameters;

transmit the selected group of the determined signal strength level_quality control parameters to at least one of the BS and the MS.

A Base Station Controller (BSC) for improving communication quality in a Code Division Multiple Access (CDMA) system includes:

a first unit, configured to store more than one group of quality control parameters for a Base Station (BS) covered by the BSC;

a second unit, configured to monitor communication quality parameters reported by at least one of the BS and a Mobile Station (MS) covered by the BS during a call;

a third unit, configured to select one of the more than one group of the quality control parameters according to the communication quality parameters; and a fourth unit, configured to transmit the selected group of the quality control parameters to at least one of the BS and the MS.

It can be seen that the solution provided by the present invention brings forth the following features.

The above solution adopts different power control parameters and soft handover parameters according to signal strength levels between the MS and the BS, to improve the communication quality enjoyed by the users who locate in an area where CDMA network signals are weak.

In addition, the above solution may implement comprehensive judgment of the signal strength levels between the MS and the BS and the workload of the current BS. It helps to improve the communication quality to a certain extent in an area where CDMA network signals are weak, when the workload of current BS is light.

EMBODIMENTS OF THE INVENTION

The present invention is hereinafter further described in detail with reference to the accompanying drawings as well as embodiments.

In an embodiment, two groups of quality control parameters are stored in a Base Station Controller (BSC) 201 for each Base Station (BS) 203 covered by the BSC 201. The quality control parameters are used for communication quality control. The first group includes strong-signal parameters. The strong-signal parameters are adopted when a Mobile Station (MS) 204 moves into an area where CDMA network signals are strong, in order to provide higher system capacity. The second group includes weak-signal parameters, and the weak-signal parameters are adopted when the MS 204 moves into an area where CDMA network signals are weak, in order to improve the communication quality in this area.

The quality control parameters are divided into two categories: power control parameters and handoff parameters. The power control parameters include a maximum transmit power threshold of the forward channel of the BS 203, etc. The handoff parameters include a maximum active set branch threshold, a pilot add threshold (Tadd), a pilot drop threshold (Tdrop), etc.

In order to improve the communication quality in an area where CDMA signals are weak, the value of the maximum transmit power threshold in the second group is greater than that in the first group. Therefore the quality of the communication between the MS and the BS can be improved by increasing the transmit power of the BS 203 and the MS 204.

Alternatively, the maximum active set branch threshold in the second group is greater than that in the first group. Or, the Tadd in the second group is less than the Tadd in the first group. Or, the Tdrop in the second group is less than the Tdrop in the first group. According to above settings, the quality of the communication between the MS 204 and the BS 203 can be improved due to greater soft handover gain. To further improve the communication quality, each group of quality control parameters has two or more power control parameters and handoff parameters which are set in one of the above ways.

In addition, the quality control parameters in other embodiments include the parameters described in the fore-going description. The power control parameters may further include a Frame Error Rate (FER), a reverse outer-loop power threshold, etc. The handoff parameters may further include a Tcomp, a dynamic soft handoff slope, a dynamic soft handoff add intercept, a dynamic soft handoff drop intercept, a Ttdrop, etc. The communication quality in the area where CDMA signals are weak may also be improved by adjusting these parameters.

Figure 1:
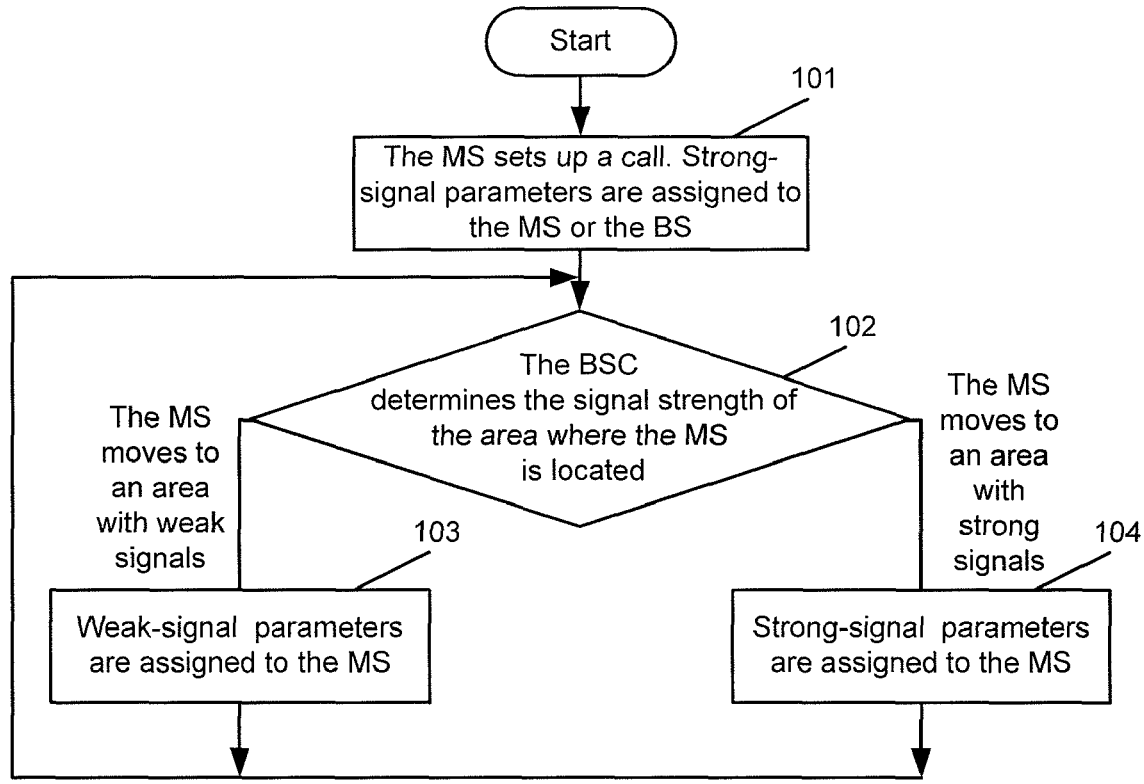
FIG. 1 is a flow chart of an embodiment of the present invention illustrating a method for improving communication quality in a CDMA system.
Figure 2:
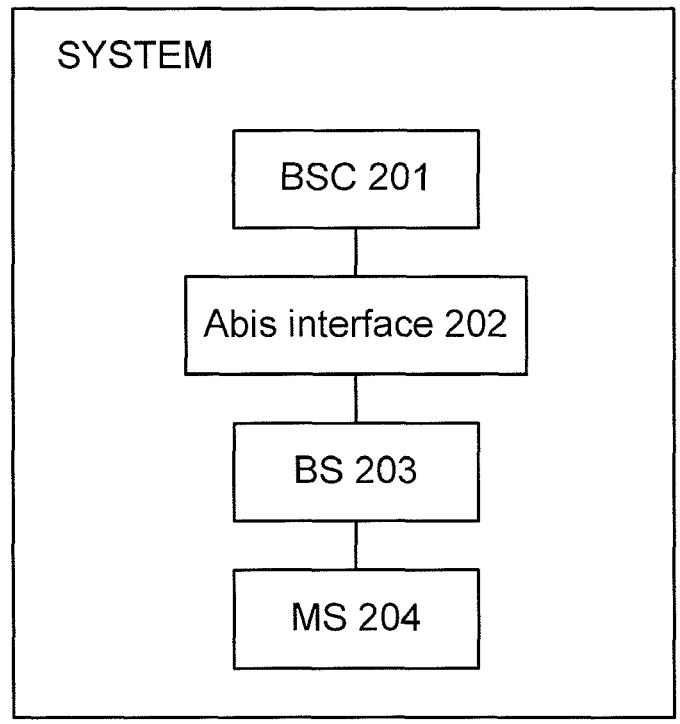
FIG. 2 is a block diagram of an embodiment of the present invention illustrating a system for improving communication quality.

FIG. 1 shows a flow chart illustrating a method adopted in an embodiment of the present invention. As shown in FIG. 1, the method adopted may include followings.

Step 101: when an MS sets up a call, a BSC which covers the MS assigns strong-signal parameters to the MS and a corresponding BS, regarding the MS as in an area where CDMA signals are strong. In such a case, the strong-signal parameters are default quality control parameters.

In this step, when the MS sets up a call, the strong-signal parameters are assigned to the MS and the corresponding BS, in order to save system resources as much as possible and to reduce interference to adjacent MSs. Alternatively, the BSC may also assigns the weak-signal parameters to the MS and the corresponding BS, regarding the MS as in an area where CDMA signals are weak. Such alternative operation, in which the weak-signal parameters are regarded as the default quality control parameters, is also in the spirit and scope of the present invention.

Step 102: during the call, the BSC monitors the communication quality parameters and determines the CDMA signal strength in the area where the MS is located at present. The communication quality parameters of the communication between the MS and the BS are reported by the BS or the MS. If the MS moves from an area with strong CDMA signals to an area with weak CDMA signals, Step 103 may be performed; if the MS moves from an area with weak CDMA signals to an area with strong CDMA signals, Step 104 may be performed.

Step 103: the BSC assigns the weak-signal parameters to the BS or the MS and returns to Step 102.

Step 104: the BSC assigns the strong-signal parameters to the BS or the MS and returns to Step 102.

The communication quality parameters described in Step 102 include two categories of parameters. A first category, which is measured by the MS, includes a Forward FER and a forward pilot channel strength, etc. On obtaining the first category of the communication quality parameters, the MS reports the obtained parameters to the BSC through a Power Measurement Report Message (PMRM) or a Pilot Strength Measurement Message (PSMM). A second category, which is measured by the BS, includes a Reverse FER, etc. And on obtaining the second category of the communication quality parameters, the BS reports the obtained parameters to the BSC through an Abis interface between the BS and the BSC.

Further, there are several ways to determine the CDMA signal strength described in Step 102. For example, the CDMA signal strength may be determined with reference to at least one of the communication quality parameters.

For example, the BSC may determine the CDMA signal strength based on the Forward FER reported by the MS. The process may include: configuring a forward frame error rate threshold in advance by the BSC; determining the CDMA signal strength by comparing the value of the Forward FER and the forward frame error rate threshold. That is, if the value of the Forward FER is greater than the forward frame error rate threshold, the CDMA signals are weak, otherwise, the CDMA signals are strong.

For another example, the BSC may determine the CDMA signal strength based on the Reverse FER. The process may include configuring the reverse frame error rate threshold in advance by the BSC; determining the CDMA signal strength by comparing the value of the Reverse FER and the reverse frame error rate threshold. That is, if the Reverse FER is greater than the reverse frame error rate threshold, the CDMA signals are weak; otherwise, the CDMA signals are strong.

For another example, the BSC may also determine the CDMA signal strength in the area where the MS is located at present based on the forward pilot signal strength. The process may include configuring the forward pilot signal strength threshold in advance by the BSC; determining the CDMA signal strength by comparing the value of the forward pilot signal strength and the forward pilot signal strength threshold. If the forward pilot signal strength reported by the MS is less than the forward pilot signal strength threshold, the CDMA signals are weak; otherwise, the CDMA signals are strong.

Further, any combination of the above communication quality parameters may be taken into consideration to determine the CDMA signal strength in the area where the MS is located at present. For example, the BSC may determine the CDMA signal strength based on both the Forward FER and the forward pilot signal strength. The process may include configuring the forward frame error rate threshold and the forward pilot signal strength threshold in advance respectively by the BSC. If the Forward FER is greater than the forward frame error rate threshold and the forward pilot signal strength is less than the forward pilot signal strength threshold, the CDMA signals are weak; if the Forward FER is less than the forward frame error rate threshold and/or the forward pilot signal strength is greater than the forward pilot signal strength threshold, the CDMA signals are strong. Similar processes may be adopted to determine the CDMA signal strength based on the Forward FER and the Reverse FER, or based on the Reverse FER and the forward pilot signal strength, or based on the Forward FER, the Reverse FER and the forward pilot signal strength, without departing from the protection scope of the present invention.

In Steps 103 and 104, the BSC transmits the weak-signal parameters or the strong-signal parameters to the BS via an internal Abis interface, and the BS transmits the parameters to the MS through an in-traffic system parameter message or an extended handover direction message.

Further, in a preferred embodiment, the BSC may determine the CDMA signal strength based on multiple groups of communication quality parameters obtained through a number of measurement operations. In this embodiment, inaccurate determination of the CDMA signal strength can be prevented. Let's describe the method in detail:

According to the configuration of the CDMA system, when the MS moves from an area with strong CDMA signals to an area with weak CDMA signals, as the communication quality declines on the forward link, the MS will continuously report PMRMs which carry communication quality parameters including the Forward FER to the BS. If each of the Forward FERs reported by the MS in a series of messages is greater than the Forward frame error rate threshold, the BSC determines that the MS has moved to an area with weak CDMA signals.

When the MS moves from an area with weak CDMA signals to an area with strong CDMA signals, the MS does not report the PMRMs continuously; therefore the BSC shall control the MS to regularly report the PSMMs which carry the forward pilot signal strength. If the BSC detects that each of the forward pilot signal strength values reported by the MS in a series of messages is greater than the forward pilot signal strength threshold, the BSC determines that the MS has moved to an area with strong CDMA signals. In practical applications, the number of messages reported may be determined based on different circumstances so as to prevent inaccurate determination of the CDMA signal strength and to adjust the communication quality in time.

It can be seen that, through the solution adopted in the above embodiments, by adopting different transmit power parameters or handoff parameters for the BS or the MS, communication quality between the MS and the BS can be improved and the call-drop rate can be reduced when the MS is located in an areas where CDMA signals are weak.

We know that communication quality and system capacity commonly conflict in a CDMA system. So in practical applications, the method of sacrificing system capacity for communication quality and improving the communication quality only in areas of weak CDMA signals has its own limitation.

In another embodiment of the present invention, the BSC takes the workload of current BS into consideration, as well as the CDMA signal strength in the area where the MS is located at present, in order to adjust the quality control parameters. In such way, the communication quality in the area with weak CDMA signals is improved when the workload of current BS is light; if the workload of current BS is heavy, system capacity shall be of the first priority, and the quality control parameters shall not be adjusted.

The solution adopted in this second embodiment is basically the same as the method in the first embodiment. Similarly, two groups of quality control parameters are saved in advance in the BSC: the group of strong-signal parameters and the group of weak-signal parameters. The configuration processes of the two groups of parameters are also the same.

In this embodiment, steps 201, 203 and 204 are similar with the steps 101, 103 and 104. However, step 202 is different from the step 102.

Step 202: After the BSC configures default parameters to the BS or the MS in a call set-up procedure, the BSC monitors the communication quality parameters and the workload parameters, and determines the CDMA signal strength in the area where the MS is located at present and the current workload of the BS. The communication quality of the communication between the MS and the BS parameters are reported by the BS or MS. The workload parameters are reported by the BS during the call. If the MS moves from an area with weak CDMA signals to an area with strong CDMA signals, or if the workload of the BS is heavy, the BSC assigns the strong-signal parameters to the BS or the MS. If the MS moves from an area with strong CDMA signals to an area with weak CDMA signals, and the workload of the BS is light, the BSC assigns the weak-signal parameters to the BS or the MS. In the above processes, it is because when the BSC detects that the workload of the BS is heavy, the BSC assigns the strong-signal parameters to the BS or the MS, that the system capacity is ensured.

The workload parameters described may include: a total transmit power of the forward channel of the BS, a total receive power of the reverse channel of the BS, the number of users in communication, etc. The workload parameters are measured by the BS and reported to the BSC through an Abis interface between the BS and the BSC.

There are several ways to determine the workload of the BS. For example, the workload of the BS can be determined based on the total transmit power of the forward channel of the BS. The determination process may include: configuring a total transmit power threshold of the forward channel of the BS in advance by the BSC and determining that the workload of the BS is heavy, if the total transmit power of the forward channel of the BS detected by the BS is greater than the total transmit power threshold; or, determining that the workload of the BS is light, if the total transmit power of the forward channel of the BS detected by the BS is less than the total transmit power threshold. Similar determination process can be adopted to determine the workload of the BS based on the total receive power of the reverse channel of the BS and the number of users in communication.

Generally speaking, through the solution adopted in this embodiment, the communication quality can be improved as much as possible in an area with weak CDMA signals as long as the workload of the system permits. However, when the workload of the system is heavy, the system capacity should be of the first priority and the quality control parameters of the MS may not be adjusted.

It should be noted that, although the BSC in preceding embodiments stores two groups of quality control parameters for the BSs covered by the BSC, the BSC may maintain more than two groups of quality control parameters in other embodiments. Also, the BSC may divide the CDMA signal strength in an area where an MS is located into multiple levels and set each group of quality control parameters to correspond to a signal strength level. In detail, compared with the quality control parameters corresponding to a comparatively low signal strength level, the quality control parameters corresponding to a comparatively high signal strength level may include at least one of a lower maximum transmit power of the forward channel of the BS, a lower minimum transmit power of the forward channel of the BS, a lower maximum active set branch threshold, a higher Tadd and a higher Tdrop. The BSC may choose a group quality control parameters corresponding to an appropriate signal strength level based on the communication quality parameters reported by the BS or MS so as to improve the communication quality between the MS and BS according to the signal strength levels.

In the process of determining the signal strength level in the area where the MS is located at present, the BSC should first of all configure different ceiling and floor thresholds of the communication quality parameters to correspond to different signal strength levels.

When the communication quality parameters include only one parameter, the BSC compares the reported communication quality parameter with the pre-configured ceiling and floor thresholds of the signal strength levels. If the reported communication quality parameter is greater than the floor threshold of a level and less than the ceiling threshold of the level, the level can be determined to be the level corresponding to the reported communication parameter. Hence the signal strength level is regarded as the signal strength level of the area where the MS is located at present.

When the communication quality parameters include more than one parameter, the BSC compares each of the reported communication quality parameters with the pre-configured ceiling and floor thresholds of the parameter which correspond to different signal strength levels, if the reported communication quality parameter is greater than the floor threshold of a level and less than the ceiling threshold of the level, the level can be determined to be the level corresponding to the communication quality parameter. After a corresponding signal strength level has been determined for each of the reported communication quality parameters, the highest signal strength level among all of the determined levels shall be regarded as the signal strength level of the area where the MS is located at present.

In such case, the BSC can further monitor the workload parameters of the BS as well as the communication quality. When the BSC detects that the workload of the BS is heavy, the BSC assigns the highest signal strength level as the signal strength level of the area where the MS is located to the BS or the MS.

Though the present invention has been illustrated and described by some preferred embodiments, those skilled in the art should understand that various changes may be made in form and detail without departing from the spirit and the scope of the present invention and therefore should be covered in the protection scope of the present invention assigned by the appended claims and its equivalents.

The invention claimed is:

1. A method for improving communication quality, comprising:
    storing, by a Base Station Controller (BSC), groups of quality control parameters for a Base Station (BS) covered by the BSC;
    setting signal strength levels of areas covered by the BSC, wherein each of the signal strength levels comprises a ceiling threshold and a floor threshold;
    monitoring communication quality parameters reported by at least one of the BS and a Mobile Station (MS) covered by the BS during a call, wherein the communication quality parameters comprise one kind of communication quality parameter;
    comparing, by the BSC, the value of the communication quality parameter reported with the ceiling and the floor thresholds of one of the signal strength levels;
    selecting the one of the signal strength levels as the signal strength level of the area where the MS is located, if the value of the communication quality parameter reported is between the ceiling and the floor thresholds;
    selecting one group of the groups of the quality control parameters according to the signal strength level selected; and
    transmitting the selected group of the quality control parameters to at least one of the BS and the MS.

2. The method of claim 1, wherein the quality control parameters comprise at least one of: a maximum transmit power threshold of the forward channel of the BS, a minimum transmit power threshold of the forward channel of the BS, a maximum active set branch threshold and a pilot add threshold and a pilot drop threshold.

3. The method of claim 1, wherein the number of the groups of the quality control parameters is two.

4. The method of claim 1, wherein the communication quality parameters comprise at least one of: a forward frame error rate, a forward pilot channel strength and a reverse frame error rate.

5. The method of claim 1, wherein the transmitting process comprises one of:
    transmitting, by the BSC, the group of the quality control parameters to the BS through an internal Abis interface;
    transmitting the group of the quality control parameters to the MS through an in-traffic system parameter message or an extended handover direction message.

6. The method of claim 1, further comprising:
    monitoring, by the BSC, workload parameters of the BS;
    determining a workload of the BS according to the workload parameters; and
    the determining process comprises:
    setting the highest signal strength level as the signal strength level of the area where the MS is located, if the workload of the BS is heavy; and
    determining the signal strength level of the area where the MS is located according to the communication quality parameters reported; and selecting one of the groups of the quality control parameters according to the signal strength level, if the workload of the BS is light.

7. The method of claim 6, wherein the workload parameters comprise at least one of: a total transmit power of the forward channel of the BS, a total receive power of the reverse channel of the BS and the number of users in communication.

8. The system of claim 7, wherein the BSC is further configured to monitor workload parameters of the BS;
determine a workload of the BS according to the workload parameters reported by the BS;
set the highest signal strength level as the signal strength level of the area where the MS is located, if the workload of the BS is heavy; and
determine the signal strength level of the area where the MS is located according to the communication quality parameters reported; and selecting one of the groups of the quality control parameters according to the signal strength level, if the workload of the BS is light.

9. The method of claim 6, further comprising:
setting thresholds of the workload parameters; and
the determining the workload of the BS comprises:
comparing, by the BSC, the workload parameters reported by the BS with the thresholds and,
determining that the workload of the BS is heavy, if the workload parameters reported are greater than the thresholds;
determining that the workload of the BS is light, if the workload parameters reported are less than the thresholds.

10. The system of claim 9, wherein the BSC is further configured to set thresholds of the workload parameters; and compare the workload parameters reported by the BS with the thresholds and, determine that the workload of the BS is heavy if the workload parameters reported are greater than the thresholds, determine that the workload of the BS is light if the workload parameters reported are less than the thresholds.

11. The method of claim 1, further comprising:
adopting, by the BS and the MS, one of the groups of the quality control parameters to interact with each other when the MS sets up a call.

12. A system for improving communication quality, comprising:
a Base Station Controller (BSC), configured to store groups of quality control parameters for a Base Station (BS);
set signal strength levels of areas covered by the BSC, wherein each of the signal strength levels comprises a ceiling threshold and a floor threshold;
monitor communication quality parameters reported by at least one of the BS and a Mobile Station (MS) during a call, wherein the communication quality parameters comprise one kind of communication quality parameter;
compare, by the BSC, the value of the communication quality parameter reported with the ceiling and the floor thresholds of one of the signal strength levels;
select the one of the signal strength levels as the signal strength level of the area where the MS is located, if the value of the communication quality parameter reported is between the ceiling and the floor thresholds;
select one group of the groups of the quality control parameters according to the signal strength level selected; and transmit the selected group of the quality control parameters to at least one of the BS and the MS.

13. A method for improving communication quality, comprising:
storing, by a Base Station Controller (BSC), groups of quality control parameters for a Base Station (BS) covered by the BSC;
setting signal strength levels of areas covered by the BSC, wherein each of the signal strength levels comprises a ceiling threshold and a floor threshold;
monitoring communication quality parameters reported by at least one of the BS and a Mobile Station (MS) covered by the BS during a call, wherein the communication quality parameters comprise more than one kind of communication quality parameter; and
comparing, by the BSC, the value of the communication quality parameter reported with the ceiling and the floor thresholds of one of the signal strength levels;
determining the one of the signal strength levels as the signal strength level of one of the communication quality parameters, if the value of one of the communication quality parameters is between the ceiling and the floor thresholds;
selecting the highest signal strength level from the signal strength levels determined as the signal strength level of the area where the MS is located;
selecting one group of the groups of the quality control parameters according to the signal strength level selected; and
transmitting the selected group of the quality control parameters to at least one of the BS and the MS.

14. A system for improving communication quality, comprising:
a Base Station Controller (BSC), configured to
store groups of quality control parameters for a Base Station (BS);
set signal strength levels of areas covered by the BSC, wherein each of the signal strength levels comprises a ceiling threshold and a floor threshold;
monitor communication quality parameters reported by at least one of the BS and a Mobile Station (MS) during a call, wherein the communication quality parameters comprise more than one kind of communication quality parameter;
compare the value of each of the communication quality parameters with the ceiling and floor thresholds of one of the signal strength levels,
determine the one of the signal strength levels as the signal strength level of one of the communication quality parameters, if the value of one of the communication quality parameters is between the ceiling and the floor thresholds, and
select the highest signal strength level from the signal strength levels determined as the signal strength level of the area where the MS is located;
select one group of the groups of the quality control parameters according to the signal strength level selected; and
transmit the selected group of the quality control parameters to at least one of the BS and the MS.

* * * * *